United States Patent Office 3,741,879
Patented June 26, 1973

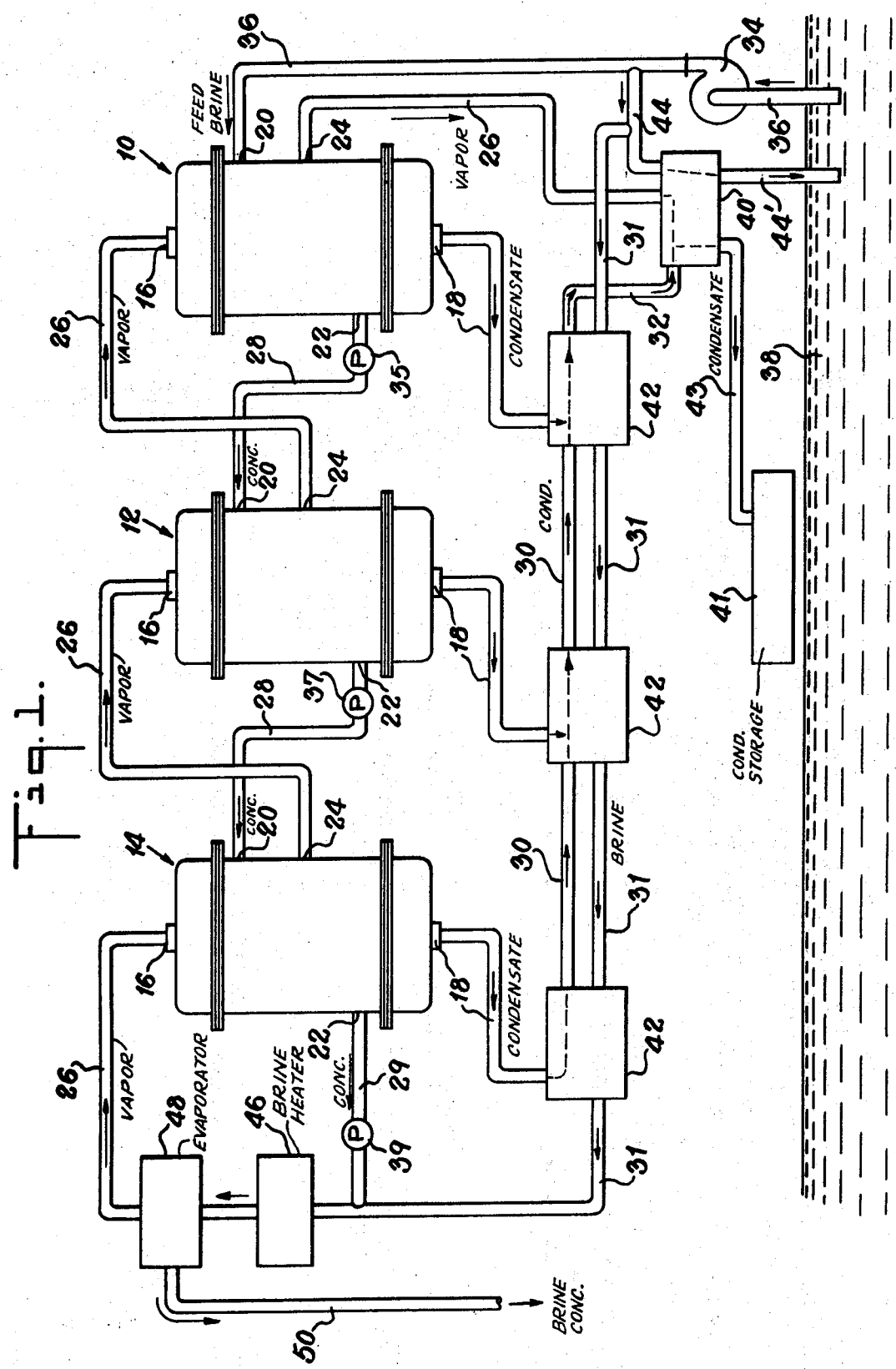

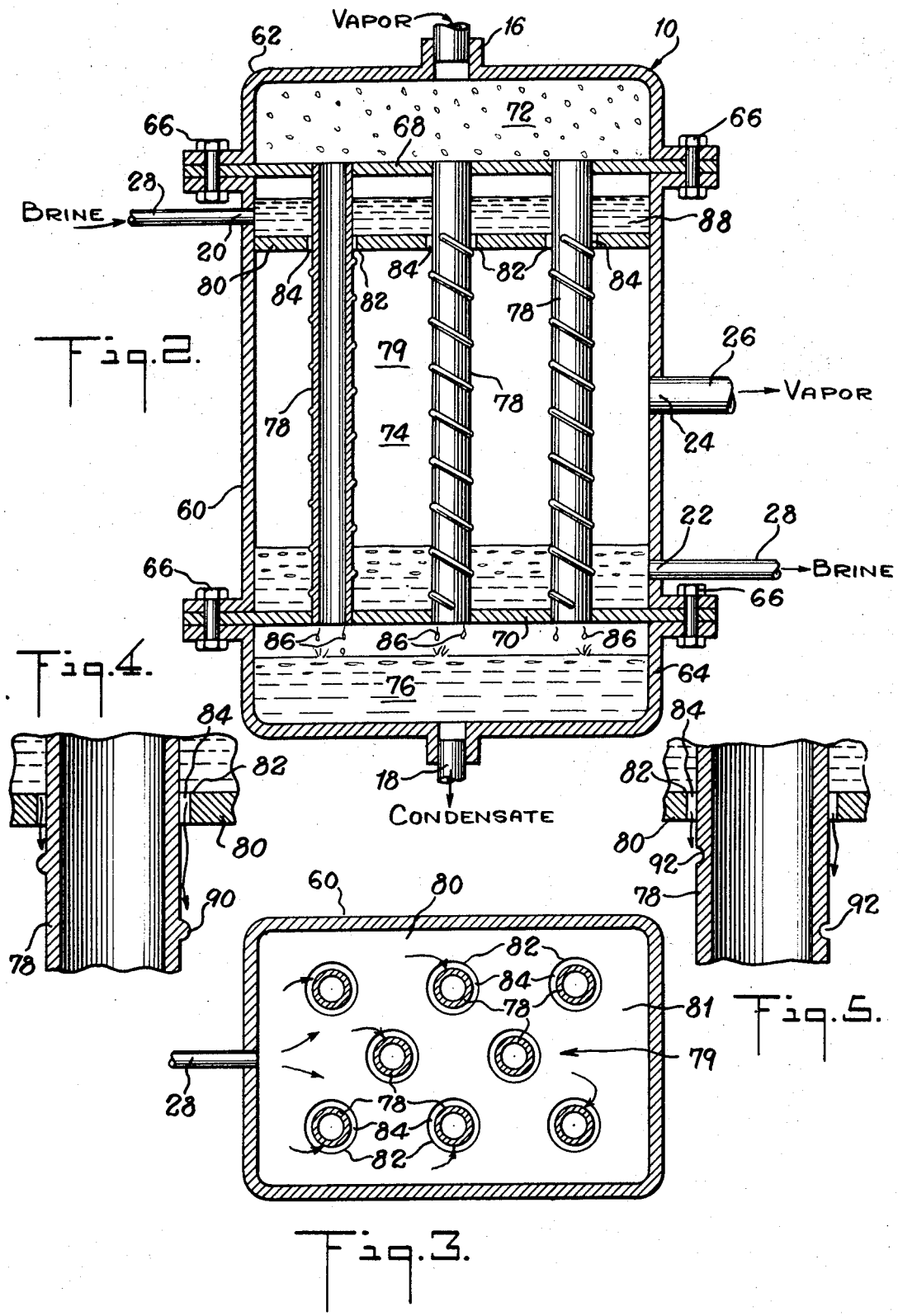

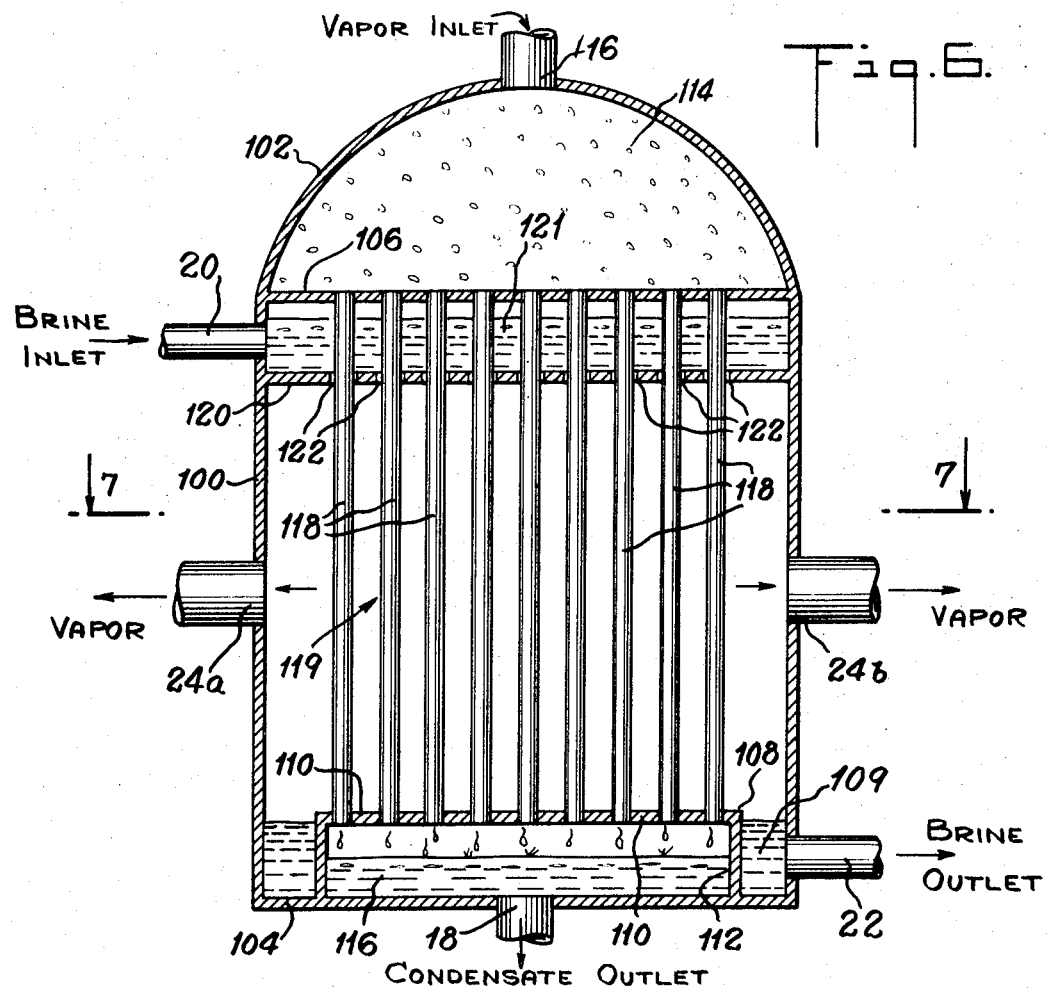
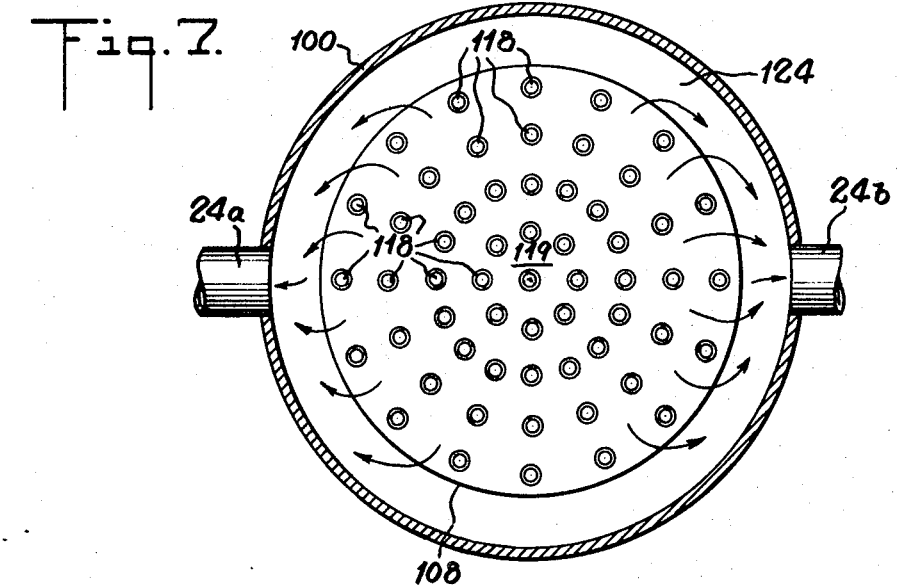

3,741,879
APPARATUS FOR DISTILLATION OF FLUIDS
Theodore R. Best, Jr., 18 Kennedy Terrace,
Westwood, N.J. 07675
Continuation-in-part of abandoned application Ser. No. 131,994, Apr. 7, 1971. This application May 30, 1972, Ser. No. 257,906
Int. Cl. B01d *1/00, 1/22, 3/00, 3/08, 3/28*
U.S. Cl. 202—236                                    13 Claims

ABSTRACT OF THE DISCLOSURE

Fluids are subjected to distillation by causing vapors to pass vertically through tubular conduits while a cooler liquid film flows over the outside of the conduits. The vapors condense and give up heat to the liquid film causing a portion of it to vaporize. The tubular conduits are contained in a bundle within a shell in which the vapors thus generated are collected. A vapor outlet is mounted in the shell to permit emission of the vapors. A perimetric space surrounding the tube bundle serves to facilitate the emission of the vapors from the shell.

This application is a continuation-in-part of my co-pending application Ser. No. 131,994, filed Apr. 7, 1971, now abandoned.

This invention relates to the generation and condensation of vapors and more particularly it concerns novel integrated condenser and evaporator arrangements.

The present invention is particularly suited for use in distillation systems wherein a solvent, e.g., pure water, is recovered from a solution, e.g., brine, by heating the brine to produce vapors and then separating and condensing the vapors. The preferred embodiment of this invention accordingly will be described in connection with a distillation system for converting sea water to fresh water.

Integrated distillation and condensation systems are known. In these known systems, brine or other liquid to be evaporated is admitted into a group or bundle of tubes to flow through them. The tubes themselves pass through the interior of a shell or chamber into which vapors, such as steam, are admitted. The brine is cooler than the vapors so that heat passes from the vapors, through the tube walls and into the brine. As a result, the vapors are condensed on the outside of the tubes while the brine within the tubes becomes heated. In some cases, the brine itself is vaporized and is transferred to another stage for condensation.

A number of difficulties have been experienced with the above described integrated evaporation and condensation systems. One of these difficulties involves the control of vapor flow within the shell to the tube surfaces. It has been difficult to obtain a good distribution of vapors among and along the tubes without resorting to complex, large and expensive structures. Also, when vapors are produced from the brine flowing through the tubes, a substantial pressure variation occurs along the length of each tube due to the large volume change which is experienced. This pressure drop adversely affects temperature equilibrium throughout the system. Another effect of this pressure variation is that it produces high velocity movement of vapors, and this in turn causes entrainment of droplets of concentrated liquid brine. These droplets are carried along with the vapors and contaminate the fresh water which is produced when the vapors are condensed.

The present invention avoids the above described difficulties of the prior art. With the present invention it is possible, in an integrated evaporation and condensation system, to obtain a more even distribution of vapors along condensing surfaces, with consequent improved heat transfer, with smaller and less expensive equipment than has been used in the past. It is also possible, with the present invention, to avoid entrainment of unevaporated liquid residue in the vapors being produced, so that condensate may be produced in a more pure form than was possible in previous equipment of comparable cost. As will be seen hereinafter, the present invention also permits flexibility in structural design. For example, with the arrangements of the present invention a greater degree of freedom is available in the selection of tube size.

The present invention achieves its improved characteristics, in part, by a reversal of the relative positions of liquids and vapors within a shell and tube unit. That is, in the present invention, vapors to be condensed are passed along inside the tubes while the liquid or brine used to cool the vapors and to become vaporized is caused to flow through the shell along the outer surface of the tubes. The vapors thus produced are not confined to the interior of the tubes, as in prior systems, but instead they experience the relatively open spaces inside the outer shell. Because of this, the vapors are not subjected to pressure variations; and their linear velocity can be kept low enough to avoid brine entrainment until they have been transferred away from the brine. Thus, a more pure form of condensate is obtained.

In its illustrative embodiment the present invention makes use of a vertical tube and shell construction wherein a plurality of fluid flow conduits are arranged to extend, more or less in parallel, up through an outer shell. The conduits open, at their upper ends, into a common vapor distribution chamber within the shell at its upper end; and the conduits open, at their lower ends, into a common condensate collecting chamber within the shell at its lower end. Vapors to be condensed are admitted into the vapor distribution chamber and they pass down inside the conduits. As the vapors pass through the conduits they are cooled and condensed. The resulting liquid condensate flows down into the common condensate collecting chamber.

A liquid film formation structure is provided within the shell just below the common vapor distribution chamber. This structure may take the form of a horizontal plate having openings through which the conduits pass, these openings being slightly larger in size than the conduits themselves so as to define slot-like openings down through which liquid may flow in film form immediately adjacent to the outer surfaces of the conduits. Means are provided for admitting liquid into the shell above the liquid film formation structure and means are provided for emitting residue liquid after it has flowed down along the conduits.

A portion of the liquid which flows down along the conduits is vaporized; and the vapors thus produced are emitted via a vapor outlet at some intermediate location between the upper and lower ends of the shell.

As will be described more fully hereinafter, special spiral configurations may be formed along the outer surfaces of the conduits to maintain the film-configuration of the liquid flowing along them.

The present invention in one aspect involves the application of the foregoing principles to a multiple effect brine desalination system wherein sea water is passed successively through a series of evaporator units as above described. The brine condenses the vapors present in each unit; and in the process of the brine becomes evaporated. The evaporated portion of the brine is transferred to a lower temperature unit for condensation, while the unevaporated portion of the brine is transferred to a higher temperature stage for condensing vapors therein while undergoing a further partial vaporization.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a diagrammatic view illustrating a multiple effect brine desalination system in which the present invention is embodied;

FIG. 2 is an elevational view, in section, illustrating an integrated evaporation-condensation unit, forming one unit of the system of FIG. 1;

FIG. 3 is a sectional view taken along line 3—3 of FIG. 2;

FIG. 4 is an enlarged fragmentary view illustrating one form of tube configuration used in the unit of FIG. 2;

FIG. 5 is a view similar to FIG. 4 but illustrating an alternate tube configuration;

FIG. 6 is an elevational view, in section, illustrating a modified integrated evaporation-condensation unit which may be utilized in the system of FIG. 1; and FIG. 7 is a sectional view taken along line 7—7 of FIG. 6.

In the system of FIG. 1 there are provided a plurality of evaporation-condensation units, 10, 12 and 14. While the system shown utilizes three such units it will be understood by those skilled in the art that a greater number of such units may be employed as may be desired.

Each of the evaporation-condensation units is provided with an upper vapor inlet 16, a lower condensate outlet 18, an upper brine inlet 20, a lower brine outlet 22 and an intermediate vapor outlet 24.

The evaporation-condensation units 10, 12 and 14 are operated at successively higher temperatures with the unit 10 being operated at the lowest temperature, the unit 12 being operated at an intermediate temperature and the unit 14 being operated at the highest temperature. Where a larger number of units are employed these also would be operated according to a series of successively increasing temperatures as viewed in a direction from right to left in FIG. 1.

Vapor conduits 26 extend between the intermediate vapor inlet 24 of each evaporation-condensation unit and the upper vapor inlet 16 of the next lower temperature unit. Brine conduits 28 extend between the lower brine outlet 22 of each evaporation-condensation unit and the upper brine inlet 20 of the next higher temperature unit. Pumps 35 and 37 are provided to pump the brine in conduits 28 and pump 39 is provided to pump the brine in conduit 29. A common condensate conduit 30 interconnects the lower condensate outlet 18 of each of the evaporation-condensation units. This common condensate conduit 30 has an outlet 32 which may be connected to some storage or utilization means 41. There is additionally provided a pump 34 which is interposed along an incoming brine conduit 36 which extends between a sea water water source 38 and the upper brine inlet 20 of the lowest temperature evaporation-condensation unit 10. The intermediate vapor outlet 24 of the lowest temperature unit 10 is connected to a condenser 40. The condenser 40 is provided with a condensate outlet 43 which is connected to the storage tank 41. A portion of the cool sea water from the incoming brine conduit 36 is diverted by means of a condenser coolant conduit 44 through the condenser 40 and condensate coolers 42. The lower brine outlet 22 of the highest temperature evaporation-condensation unit 14 is connected to a brine heater 46 through conduit 29 and, in turn, is connected to an evaporator 48. Vapors are formed in this evaporator 48 and are directed into the upper vapor inlet 16 of the highest temperature evaporation-condensation unit 14. The portion of the brine which is not vaporized in the evaporator 46 is discharged through a residue brine conduit 50 back to the sea water source 38.

In operation of the above described system, cool saline sea water or brine from the source 38 is pumped by means of the pump 34 through the incoming brine conduit 36, up to the upper brine inlet 20 of the lowest temperature evaporation-condensation unit 10. This brine passes through the interior of the unit 10 and acts, in a manner to be described, to condense vapors which enter the unit via the vapor inlet 16. In producing this condensation of vapors, the brine itself becomes heated and a portion of the brine vaporizes.

The evaporated portion of the brine in the lowest temperature unit 10 is transferred as vapor to the condenser 40 where it is cooled by incoming sea water which the condenser 40 receives via the condenser coolant conduit 44. As the vapor is cooled it forms a liquid condensate which passes via the common condensate conduit 43 to the storage tank 41. The heated sea water is returned to the source through brine conduit 44'.

The unevaporated portion of the brine which passes through the lowest temperature evaporation-condensation unit 10 exits from its lower brine outlet 22 at a somewhat increased temperature. This liquid brine passes through the brine conduit 28 to the upper brine inlet 20 of the next highest temperature evaporation-condensation unit 12. This liquid brine then passes through the unit 12 and in doing so, it cools and condenses the vapors which have entered into the unit via its upper vapor inlet 16. The vapors which are thus condensed exit in liquid form through the lower condensate outlet 18 and pass through the common condensate conduit 30 and its outlet 32. During the condensing process in the unit 12, the liquid brine which enters through its upper brine inlet 20 again experiences a further increase in temperature and partial vaporization. The portion of the brine which becomes vaporized in this manner exits through the intermediate vapor outlet 24 of the evaporation-condensation unit 12 and passes through the vapor conduit 26 back to the upper vapor inlet 16 of the lowest temperature evaporation-condensation unit 10. The unevaporated portion of the brine which has passed through the evaporation-condensation unit 12 exits at a higher temperature through the lower brine outlet 22 and is transferred via the brine conduit 28 to the upper brine inlet 20 of the highest temperature evaporation-condensation unit 14. A similar condensation and partial evaporation process takes place in the unit 14 as described above in connection with the units 12 and 10. In this case, however, the unevaporated brine which exits from the lower brine outlet 22 is transferred to the brine heater 46 and then to the evaporator 48 where it is subjected to further partial vaporization. The vapors thus formed are fed back to the highest temperature evaporation-condensation unit 14 via its upper vapor inlet 16. The remaining, unevaporated brine residue from the evaporator 48 is discharged via a residue brine conduit 50 back to the sea water source 38.

It will be appreciated from the foregoing that brine which has been drawn from the sea water source 38 passes successively through the evaporation-condensation units 10, 12 and 14 which undergoing partial evaporation and temperature rise in each of the units. Also, the vapors which have been generated from the brine in each unit are transferred via its vapor conduit 26 back to the next lower temperature unit where they are condensed by lower temperature brine. In order to achieve the above described evaporation and condensation, the pressures in the various units 10, 12 and 14 should be maintained such that the vapors entering each unit are close to saturation and at the same time the brine entering each unit is also close to saturation, i.e., at a condition of temperature and pressure at which transition from vapor to liquid, and vice versa, will take place.

The construction and operation of the evaporation-condensation units 10, 12 and 14 is best illustrated in the sectional views of FIGS. 2 and 3. As shown in FIG. 2, the evaporation-condensation unit 10 (which is identical with the units 12 and 14) includes a central circumferential shell 60, closed at the top and bottom, respectively, by a top cover 62 and a bottom cover 64. The shell 60 and the covers 62 and 64 are externally flanged and are held together by means of flange bolts 66. Upper and lower tube support plates 68 and 70 are sandwiched between the flanges of the shell and covers and are held in assembly with them by the bolts 66. The tube support plates 68 and 70 extend across the interior of the unit 10 and divide the unit into an upper vapor inlet chamber 72, an intermediate heat transfer chamber 74, and a lower condensate chamber 76. A plurality of heat transfer tubes 78 extend vertically through the intermediate heat transfer chamber 74 and are secured at their upper and lower ends by the upper and lower tube support plates 68 and 70. This plurality of heat transfer tubes 78 is commonly referred to as a tube bundle and is designated by numeral 79.

As can be seen in FIG. 2, the heat transfer tubes 78 pass through the support plates 68 and 70 and are sealed to them. Thus the vapor inlet chambers 72 and the lower condensate chamber 76, while isolated from the intermediate transfer 74, are nevertheless in communication with each other via the interior of the heat transfer tubes 78. It will be seen that the portion of the shell interior occupied by the heat transfer tubes 78 in bundle 79 is only a minor portion of the overall volume of the shell. As a result, the vapors which are generated along the outer surfaces of the tubes may experience a large volume change in their transition from the liquid to the vapor state; and yet the vapors are not subjected to high linear velocities within the shell. As a result, the remaining liquid brine is not entrained in these vapors. The vapors which pass through the insides of the tubes 78 may travel at a high linear velocity; however, since these vapors are not in contact with liquid brine within the tubes, the entrainment problem does not exist in this situation.

The tube bundle 79 is spaced from the shell 60 and is separated therefrom by a perimetric space 81. To obtain the low linear vapor velocity referred to above it is advisable that the ratio of the horizontal sectional area of the free space in the tube bundle to the horizontal sectional area of the perimetric space 81 in the tube bundle should not be greater than 1.2 to 1. The ratio of the horizontal inside diagonal dimension of the shell to the horizontal diagonal dimension of the tube bundle should be at least 1.25 to 1. The horizontal diagonal of the tube bundle is the diagonal distance between the outer surfaces of two outermost diagonally placed tubes. The ratio of the total horizontal sectional area of the tubes in the tube bundle to the horizontal sectional area of the perimetric space should not be greater than 0.6 to 1. The ratio of the total horizontal sectional area of the tubes in the tube bundle to the horizontal sectional area of the tube bundle should not be greater than 1 to 3. It can readily be seen that tubes occupy a minor portion of the space in the shell.

A brine distribution plate 80 extends across the interior of the central shell 60 a short distance below the upper tube support plate 68. The brine distribution plate 80 is provided with openings 82 through which the various heat transfer tubes 78 pass. As can be seen in FIG. 3 the openings 80 are larger in diameter than the outer diameter of the heat transfer tube 74 and cooperate with the heat transfer tube to define annular film forming passageways 84.

The upper vapor inlet 16 is located centrally of the top cover 62. The lower condensate outlet 18 is located centrally of the bottom cover 64. The upper brine inlet 20 is positioned in the central shell intermediate the brine distribution plate 80 and the upper tube support plate 68. The lower brine outlet 22 is also located in the shell 60 but at a location near the lower tube support plate 70. As can be seen, the intermediate vapor outlet 24 is positioned centrally of the outer shell 60.

While the preferred location of vapor outlet 24 is centrally as shown, it should be placed in the lower two thirds of the intermediate heat transfer chamber. If it is located above this point, some of the liquid flowing out of the passageways 84 will become entrained with the vapor and will be carried out of vapor outlet 24 with a resulting loss of efficiency.

In operation of the evaporation-condensation unit described above, steam or vapor enters through the upper vapor inlet 16 into the vapor inlet chamber 72 where it is distributed among the various heat transfer tubes 78. As the vapor passes down through the tubes it gives up heat through the walls of the tubes to the liquid brine which flows in film formation along the outer surfaces of the tubes. In the course of giving up heat through the tube walls the vapors within the tubes become condensed and form droplets 86 of liquid condensate. These droplets flow down through the tubes 78 and are collected in the lower condensate chamber 76. Liquid condensate from the chamber 76 passes out from the unit through the lower condensate outlet 18.

During the above described movement and condensation of vapors within the unit, relatively cool brine enters into the shell 60 above the brine distribution plate 80. The brine forms a liquid pool 88 above the brine distribution plate 80 to maintain an even distribution of brine throughout the cross section of the unit. The liquid brine passes down through the film forming passageways 84 and forms a liquid film about the outer surfaces of the heat transfer tubes 78. Since this brine is relatively cooler than the vapors passing through the interior of these tubes, the brine acquires heat from these vapors; and at least a portion of the brine evaporates during the course of its flow down over the outer surfaces of the tubes. The vapors thus formed accumulate within the interior of the central shell 60 and eventually exit out through the intermediate vapor outlet 24. The remaining unevaporated portion of the brine, which flows down along the outer surfaces of the tubes 78, accumulates near the bottom of the shell 60 above the lower tube support plate 70 and exits via the lower brine outlet 22.

As can be seen in the enlarged fragmentary view of FIG. 4 there is provided about the outer surface of the tubes 78 a bulged formation 90 which extends spirally down the length of the tube. This formation serves to enhance the ability of the tube to maintain the brine in a film configuration as it flows down the outer surface of the tubes. Because of the specific gravity of the liquid brine, it tends to undergo acceleration as it flows down along the outer surface of the tube. This acceleration reduces the ability of the tube surface to maintain the liquid brine in intimate contact with it. The bulged formation 90, however, serves to maintain the downward velocity of the brine at a more uniform value throughout the length of the tubes; and the ability of the tube to maintain the brine in the form of an intimately contacting film throughout the tube length is thus enhanced.

FIG. 5 illustrates an alternate tube configuration for maintaining a brine film formation throughout the length of the tubes. As can be seen in FIG. 5 there is provided a grooved formation 92 which extends spirally down the length of the outer surface of the tube 78. This grooved formation, like the bulged formation 90 in FIG. 4, serves to impede the acceleration which the liquid brine experiences in its flow down over the outer surface of the vertical tubes 78.

FIGS. 6 and 7 show a modified construction for the evaporation-condensation units. The evaporation-condensation unit shown in FIGS. 6 and 7 includes a central cylindrically shaped shell member 100, a domed shaped upper cover 102 and a flat disc shaped lower cover 104. The shell member and covers are of integral construction and may be welded together to provide a complete enclosure. An upper tube support plate 106 extends across the interior of the structure at the intersection of the upper cover 102 and the shell member 100; and a lower tube support member 108 is positioned at the bottom of the unit. This lower tube support member has a flat central portion 110 and a peripheral downwardly extending flange 112 which is sealed to the lower cover 104. The upper tube support plate 106, together with the upper cover 102, defines a vapor inlet chamber 114. The lower tube support member 108 and the lower cover 104 similarly cooperate to define a lower condensate chamber 116.

A plurality of heat exchange tubes 118 forming a tube bundle 119 extend vertically between and pass through the upper tube support plate 106 and the lower tube support member 108 thereby communicating between the vapor inlet chamber 114 and the lower condensate chamber 116. A brine distribution plate 120 extends across the interior of the shell member 100 a short distance below the upper tube support plate 106. This brine distribution plate is provided with the plurality of openings 122 through which the various heat exchange tubes 118 pass. As in the case of the preceding embodiment, the openings 122 are larger in diameter than the outer diameter of the heating exchange tubes 118 and cooperate therewith to define film forming passages leading down into the central portion of the unit to permit brine from brine pool 121 to flow into the intermediate heat transfer chamber along the surfaces of tubes 118.

The upper vapor inlet 16 is positioned centrally of the domed upper cover 102 while the lower condensate outlet 18 is located centrally of the lower cover 104. The upper brine inlet 20 is positioned between the upper tube support plate 106 and brine distribution plate 120 and the brine outlet 22 is located immediately above the lower cover 104.

It will be noted that two vapor outlets 24a and 24b are provided at diametrically opposed locations about the shell member 100. Vapor outlets 24a and 24b are preferably located in the central position shown in FIG. 6 but operation will be satisfactory if they are located in the lower two thirds of the vertical distance between plates 120 and 108.

Perimetric chamber 109 serves to collect the brine in a space which is usually of the same horizontal shape as space 124. This construction effectively prevents the brine from surrounding the lower portions of the tubes with detrimental heat transfer characteristics. Moreover, this construction improves operation as a net positive suction head always is present on the pump connected to brine outlet 22.

It will be seen in FIG. 7 that the arrangement of the various heat exchange tubes 118 is that they are arranged in bundle 119 and lie within the central region of the shell member 100 so that there remains a free perimetric space 124, preferably annular in shape, between the inner surface of the shell member 100 and the tubes 118. Also, it would be noted that the tubes are arranged in a series of radially extending paths as can be seen in FIG. 7. It has been found that this arrangement, together with the perimetric vapor space 124 and the dual vapor outlets 24a and 24b cooperate to permit high volume rates of vapor flow from within the shell 100 without corresponding the high linear flow velocity which otherwise tends to entrain liquid brine flowing down along the outer surfaces of the heat exchange tubes 118. Also, but thus maintaining low vapor velocities, the pressure differences throughout the unit are held to a minimum so that a stable and much more easily controllable operation is obtained. This is accomplished by maintaining a proper ratio of the horizontal sectional area of the free space in the tube bundle to the horizontal sectional area of the perimetric space. This ratio should not be greater than 1.2 to 1.

The ratio of the horizontal inside diameter of the shell to the horizontal diameter of the tube bundle should be at least 1.25 to 1. The horizontal diameter of the tube bundle is the distance along a diameter between the outer surfaces of two outermost tubes. The ratio of the total horizontal sectional area of the tubes in the tube bundle to the horizontal sectional area of the perimetric space should not be greater than 0.6 to 1. The ratio of the total horizontal sectional area of the tubes in the tube bundle to the horizontal sectional area of the tube bundle should not be greater than 1 to 3. It can readily be seen that tubes occupy a minor portion of the space in the shell.

It is to be understood that the embodiment of FIGS. 6 and 7 may be modified to include the tube constructions of FIGS. 2–5. Similarly, the embodiment of FIGS. 2 and 3 may be modified to include the construction of the brine collection chamber 109 of FIGS. 6 and 7.

While particular embodiments of the invention have been shown and described, it is apparent to those skilled in the art that modifications are possible without departing from the spirit of the invention of the scope of the subjoined claims.

The embodiments of the invention in which an exclusive property or privilege is claimed are defined as follows:

1. An evaporation and condensation unit comprising:
   a vertical outer shell closed at its ends;
   horizontal partition means dividing the interior of the shell into an upper vapor distribution region, an intermediate heat transfer region and a lower condensate collection region;
   a bundle of heat transfer tubes comprised of a plurality of heat transfer tubes extending vertically through the intermediate heat transfer region and communicating between said upper vapor distribution region and said lower condensate collection region, said plurality of heat transfer tubes occupying a minor portion of the total space within the heat transfer region and being spaced each from each so that there is free space thereamong;
   means for admitting vapors into said upper vapor distribution region;
   means for withdrawing condensate from said lower condensate collection region;
   inlet means for admitting a liquid into the upper portion of said heat transfer region;
   distribution means within said heat transfer region below said inlet means and configured to define film forming passageways adjacent said heat transfer tubes;
   a sump near the bottom of said heat transfer region for containing liquid which has flowed down along the outer surfaces of the tubes;
   liquid outlet means connected to the sump for removing liquid therefrom;
   vapor outlet means mounted in the outer shell in the lower two thirds of the intermediate heat transfer region for emitting vapor therefrom;
   said plurality of tubes being arranged in said bundle and displaced from the inner wall of said shell to define a perimetric vapor space between the inner wall of said shell and the tubes nearest said inner wall such that the ratio of the horizontal sectional area of the free space in the tube bundle to the horizontal sectional area of the perimetric vapor space is not greater than 1.2 to 1, the ratio of the horizontal inside diagonal dimension of the shell to the horizontal diagonal dimension of the tube bundle is at least 1.25 to 1, the ratio of the total horizontal sectional area of the tubes in the tube bundle to the horizontal sectional area of the perimetric space is not greater than 0.6 to 1 and the ratio of the total horizontal sectional area of the tubes in the tube bundle to the horizontal sectional area of the tube bundle is not greater than 1 to 3 to thereby permit free flow of vapors generated within said shell to the vapor outlet means at a relatively low velocity due to the short discharge path.

2. The invention of claim 1 wherein the vapor outlets comprises a plurality of openings in the shell.

3. The invention of claim 1 wherein the shell is circular in cross section and the perimetric vapor space and the sump perimetric chamber are annular.

4. The invention of claim 1 wherein there is a plurality of such evaporation and condensation units and including:
   liquid transfer means arranged to direct liquid to flow serially through said units in a given direction from the liquid outlet means of one unit to the inlet means of the next unit;
   vapor transfer means arranged to direct vapors in a direction opposite said given direction from the vapor outlet means of said next unit to the means for admitting vapors of said one unit.

5. The invention of claim 1 wherein the sump is a perimetric chamber below the bottom of the bundle of heat transfer tubes such that the liquid flowing down the outside of said tubes is collected therein so as to be out of contact with the lower portions of the tubes.

6. The invention of claim 5 wherein the vapor outlets comprises a plurality of openings in the shell.

7. The invention of claim 5 wherein there is a plurality of such evaporation and condensation units and including:
   liquid transfer means arranged to direct liquid to flow serially through said units in a given direction from the liquid outlet means of one unit to the inlet means of the next unit;
   vapor transfer means arranged to direct vapors in a direction opposite said given direction from the vapor outlet means of said next unit to the means for admitting vapors of said one unit.

8. The invention of claim 5 wherein the shell is circular in cross section and the perimetric vapor space and the sump perimetric chamber are annular.

9. The invention of claim 8 wherein the vapor outlets comprises a plurality of openings in the shell.

10. The invention of claim 1 wherein at least one of the heat transfer tubes is formed with the surface irregularities about its outer surface to impede the acceleration of the flow of the liquid film down the outer surface of the said tube.

11. The invention of claim 10 wherein the said surface irregularity is in spiral formation extending about and along the heat transfer tube.

12. The invention of claim 10 wherein the surface irregularity is a bulged formation.

13. The invention of claim 10 wherein the surface irregularity is a grooved formation.

References Cited

UNITED STATES PATENTS

| | | | |
|---|---|---|---|
| 344,586 | 6/1886 | Lillie | 159—13 B |
| 1,514,819 | 11/1924 | Armstrong | 159—27 R |
| 2,349,657 | 5/1944 | Hermelin | 159—13 B |
| 2,584,357 | 2/1952 | Loebel | 159—24 R |
| 3,099,607 | 7/1963 | Lustenader | 203—10 |
| 3,118,775 | 1/1964 | Byer et al. | 99—205 |
| 3,227,630 | 1/1966 | Beckman | 202—205 |
| 3,322,648 | 5/1967 | Kays et al. | 159— 2 MS X |
| 3,366,158 | 1/1968 | Rosenblad | 159—13 B |
| 3,527,281 | 9/1970 | Hamill | 159—17 R |
| 1,566,539 | 12/1925 | Kermer | 159—27 |

FOREIGN PATENTS

| | | | |
|---|---|---|---|
| 11,352 | 1889 | Great Britain | 159—13 B |
| 82,755 | 12/1894 | Germany | 159—27 R |

NORMAN YUDKOFF, Primary Examiner

J. SOFER, Assistant Examiner

U.S. Cl. X.R.

159—13 B, 28 R; 203—89

UNITED STATES PATENT OFFICE
CERTIFICATE OF CORRECTION

Patent No. 3,741,879          Dated June 26, 1973

Inventor(s) Theodore R. Best, Jr.

It is certified that error appears in the above-identified patent and that said Letters Patent are hereby corrected as shown below:

Column 3, line 69, "water" should be deleted
Column 4, line  9, "46" should read --48--
Column 5, line 71, "80" should read --82--
Column 5, line 72, "tube 74" should read --tubes 78--
Column 5, line 73, "tube" should read --tubes--

Signed and sealed this 2nd day of April 1974.

(SEAL)
Attest:

EDWARD M. FLETCHER, JR.
Attesting Officer

C. MARSHALL DANN
Commissioner of Patents